United States Patent
Patel et al.

(10) Patent No.: US 9,819,255 B2
(45) Date of Patent: Nov. 14, 2017

(54) LCL FILTER RESONANCE MITIGATION TECHNIQUE FOR VOLTAGE SOURCE CONVERTERS

(71) Applicant: Rockwell Automation Technologies, Inc., Mayfield Heights, OH (US)

(72) Inventors: Yogesh P. Patel, Grafton, WI (US); Lixiang Wei, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 170 days.

(21) Appl. No.: 14/566,752

(22) Filed: Dec. 11, 2014

(65) Prior Publication Data
US 2016/0013715 A1 Jan. 14, 2016

Related U.S. Application Data

(60) Provisional application No. 62/021,949, filed on Jul. 8, 2014.

(51) Int. Cl.
*H02M 1/12* (2006.01)
*H02M 7/04* (2006.01)

(52) U.S. Cl.
CPC ............ *H02M 1/126* (2013.01); *H02M 1/12* (2013.01); *H02M 7/04* (2013.01)

(58) Field of Classification Search
CPC ................................ H02M 1/126; H02M 7/04
See application file for complete search history.

(56) References Cited

U.S. PATENT DOCUMENTS

| | | | |
|---|---|---|---|
| 4,937,719 A | 6/1990 | Yamada et al. | |
| 7,190,143 B2 | 3/2007 | Wei et al. | |
| 7,502,238 B2 | 3/2009 | Wei et al. | |
| 7,602,622 B2 | 10/2009 | Wei et al. | |
| 7,728,544 B2 | 6/2010 | Qian et al. | |
| 8,816,631 B2 | 8/2014 | Wei et al. | |

(Continued)

FOREIGN PATENT DOCUMENTS

| | | | |
|---|---|---|---|
| CN | 102201739 A | 9/2011 | |
| EP | 2395651 A2 * | 12/2011 | ............ H02M 1/126 |

OTHER PUBLICATIONS

European Search Report, EP Application No. 15175629.3, dated Nov. 20, 2015; Completed Nov. 11, 2015, 10 pgs.

(Continued)

*Primary Examiner* — Jue Zhang
*Assistant Examiner* — Lakaisha Jackson
(74) *Attorney, Agent, or Firm* — Fay Sharpe LLP

(57) ABSTRACT

Control apparatus, techniques and computer readable mediums are presented to mitigate LCL filter resonance issue for voltage source converters. Two level voltage source converter with and without passive damping of LCL filter are selected for the comparative study. Control algorithms are presented to estimate the source impedance based on variable carrier PWM. Estimated source impedance is used to tune the control of the VSC to avoid the resonance of LCL filter has been presented. In situations in which LCL resonance cannot be avoided by tuning the control parameters, energy efficient techniques are disclosed to provide selective passive damping to facilitate continued power conversion system operation without significant adverse impact on system performance.

19 Claims, 7 Drawing Sheets

(56) References Cited

U.S. PATENT DOCUMENTS

| | | | |
|---|---|---|---|
| 2008/0278109 A1 | 11/2008 | Qian et al. | |
| 2010/0188071 A1* | 7/2010 | Kajouke | G01R 31/2837 |
| | | | 324/76.39 |
| 2011/0062983 A1* | 3/2011 | Gupta | H03K 19/00361 |
| | | | 326/26 |
| 2012/0106676 A1* | 5/2012 | McCallister | H03F 1/0266 |
| | | | 375/297 |
| 2012/0189926 A1* | 7/2012 | Yabutani | H01M 8/04425 |
| | | | 429/414 |
| 2013/0083571 A1* | 4/2013 | Pu | H02M 1/126 |
| | | | 363/44 |
| 2013/0241451 A1 | 9/2013 | Wei et al. | |
| 2013/0286692 A1 | 10/2013 | Patel et al. | |
| 2013/0289911 A1 | 10/2013 | Patel et al. | |
| 2014/0104901 A1* | 4/2014 | Nguyen | H02M 1/126 |
| | | | 363/48 |
| 2014/0268953 A1 | 9/2014 | Patel et al. | |
| 2014/0268954 A1 | 9/2014 | Wei et al. | |
| 2015/0280597 A1* | 10/2015 | Takase | H02M 1/12 |
| | | | 323/271 |

OTHER PUBLICATIONS

Ahmed, et al., "Passive Filter Design for Three-Phase Inverter Interfacing in Distributed Generation", IEEE Xplore, downloaded on Apr. 18, 2010 at 13:45:10 UTC from IEEE Xplore, 9 pgs.

European Official Communication dated Apr. 11, 2017, in connection with Application No. 15175629.3-1809.

\* cited by examiner

LCL FILTER RESONANCE MITIGATION TECHNIQUE FOR VOLTAGE SOURCE CONVERTERS

REFERENCE TO RELATED APPLICATION

This application claims priority to, and the benefit of, U.S. Provisional Patent Application Ser. No. 62/021,949, filed Jul. 8, 2014, and entitled LCL FILTER RESONANCE MITIGATION TECHNIQUE FOR VOLTAGE SOURCE CONVERTERS, the entirety of which application is hereby incorporated by reference.

BACKGROUND INFORMATION

The subject matter disclosed herein relates to power conversion, and more specifically to apparatus and techniques for mitigating LCL filter resonance in power conversion systems.

BRIEF DESCRIPTION

Power converter control techniques and apparatus are presented to mitigate LCL filter resonance issues by estimating source impedance for use in tuning the rectifier control based on an identified resonance frequency.

DETAILED DESCRIPTION

Voltage source converters (VSC) are extensively used in applications like wind, solar, fuel cell and motor drives etc. Advantages of the VSC include variable power factor, controllable DC link voltage and bidirectional power flow. Depending on the rating of the unit, the switching frequency of the power device may be variable from 3-12 kHz. Using a VSC in conjunction with an LCL filter facilitates low overall system harmonic distortion and helps reduce the system electromagnetic interference (EMI). Source impedance information is important for proper tuning of the active rectifier converter control loops. The present disclosure provides techniques and apparatus to estimate the source impedance of the system, which can be used to tune one or more control loops and potentially mitigate or avoid resonance issues using variable active rectifier carrier frequency. In certain embodiments, the rectifier carrier frequency used for pulse width modulation (PWM) control of the rectifier switching devices is swept continuously or incrementally from a nominal switching frequency downward toward the fundamental frequency of the AC source used to power the conversion system. During the carrier frequency sweep or adjustment, the onset of resonance in the LCL filter circuit is detected or inferred at one or more particular frequencies, and the source impedance is estimated based on this frequency value. With this information, the active rectifier control loops and other operating parameters can be selectively adjusted in order to mitigate or avoid LCL filter resonance conditions during operation.

Figure 5:
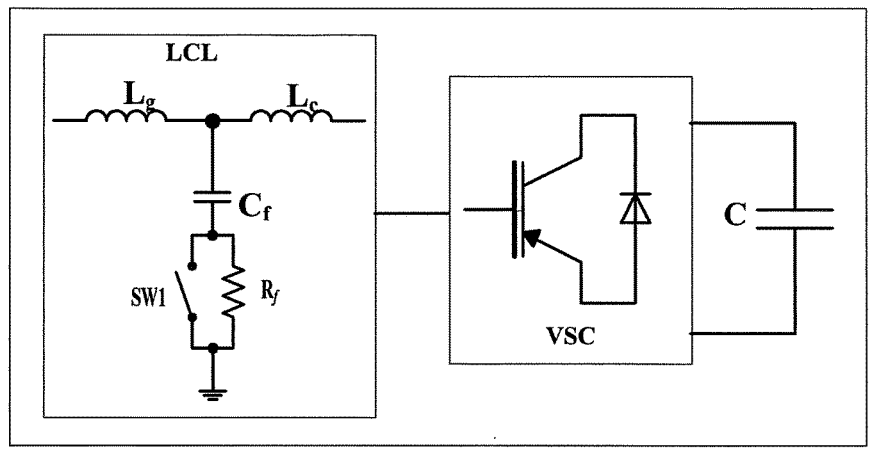
FIG. 5 is a schematic diagram.

Mathematical models of the LCL filter are provided below, both with and without passive damping. The disclosed processes employ variable frequency PWM carrier techniques to actuate the resonance in the LCL filter, and frequency spectrum analysis is used in certain embodiments to identify the resonance peak and estimate the source impedance. The inventors have appreciated that the effect of the source impedance on the LCL resonance characteristic can be used to determine a VSC control loop gain parameter and/or other active front end (AFE) rectifier operating parameters in order to alleviate potential resonance issues. In some applications, actual resonance cannot practically be avoided through rectifier operating parameter adjustment, and passive damping may then be selectively employed for reducing or eliminated LCL resonance. For example, in one possible embodiment, a switchable damping resistor $R_f$ is added into an LCL filter circuit by opening a switch SW1 as shown in FIG. 5, where the switch actuation can be manual and/or under control of a drive controller in certain embodiments.

Figure 1:
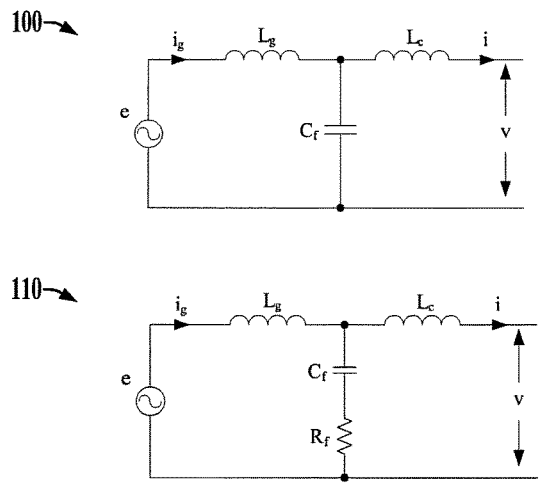
FIG. 1 is a schematic diagram.

FIG. 1 shows a per phase LCL filter, including one implementation 100 without passive damping as well as another implementation 110 with passive damping, where the $L_g$, and $L_c$ respectively represent the grid side and converter side filter inductances, $C_f$ is a filter capacitor and $R_f$ is the passive damping resistor in the embodiment 110. In a three-phase system, three such filter circuits are provided, each individually corresponding to one of the input phases. The transfer function for the LCL filter with and without damping is given by equations (1) and (2) below, and the resonance frequency $f_{res}$ can be evaluated using equation (3).

$$\frac{i_{(s)}}{v_{(s)}} = \frac{S^2 L_g C_f + 1}{S[S^2 L_g L_c C_f + (L_g + L_c)]} \quad (1)$$

$$\frac{i_{(s)}}{v_{(s)}} = \frac{S^2 L_g C_f + S C_f R_f + 1}{S[S^2 L_g L_c C_f + S C_f R_f (L_g + L_c) + (L_g + L_c)]} \quad (2)$$

$$f_{res} = \frac{1}{2\pi} \sqrt{\frac{L_g + L_c}{L_g L_c C_f}} \quad (3)$$

For an example VSC rated at 300 kW with 3% grid side inductors $L_g$, 9% converter side inductors $L_c$ and a 5% capacitor $C_f$, the resonance frequency of the filter system itself is 1.8 kHz.

Figure 2:
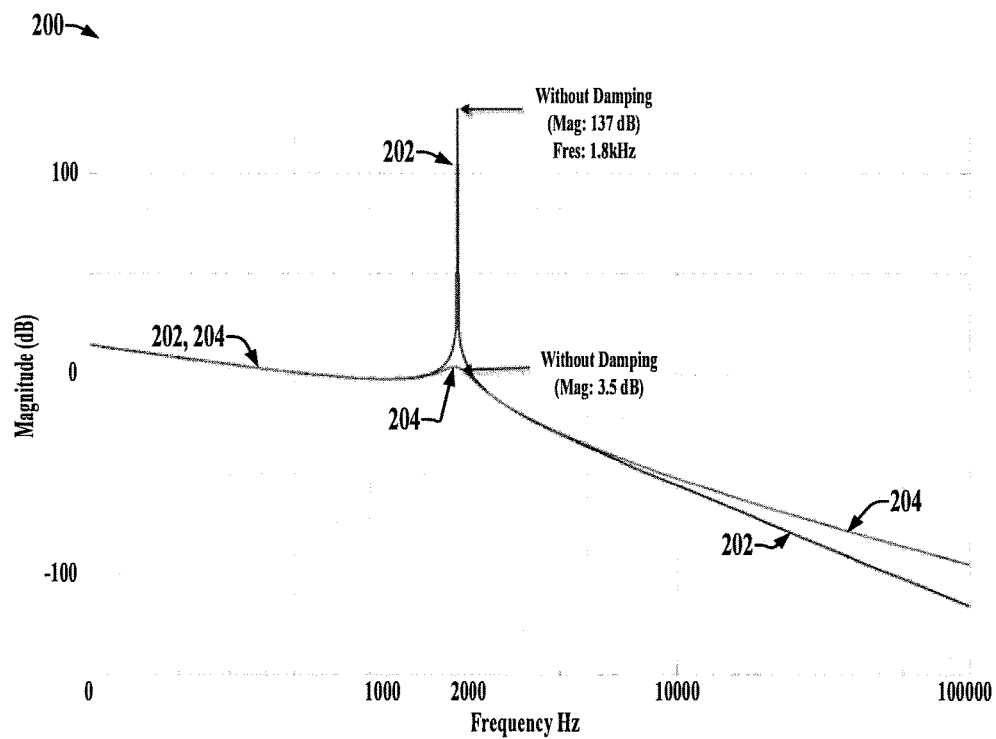
FIG. 2 is a graph.

FIG. 2 provides a graph 200 showing Bode plot curves 202 and 204 of the LCL filter as a function of frequency, where the curve 202 shows the filter frequency response without damping in the curve 204 shows the response with damping. In this case, the admittance without damping is 137 dB a resonant frequency of 1.8 kHz, whereas the use of resistive damping ($R_f$ in FIG. 1) reduces the admittance at the resonant frequency to 3.5 dB.

Figure 3:
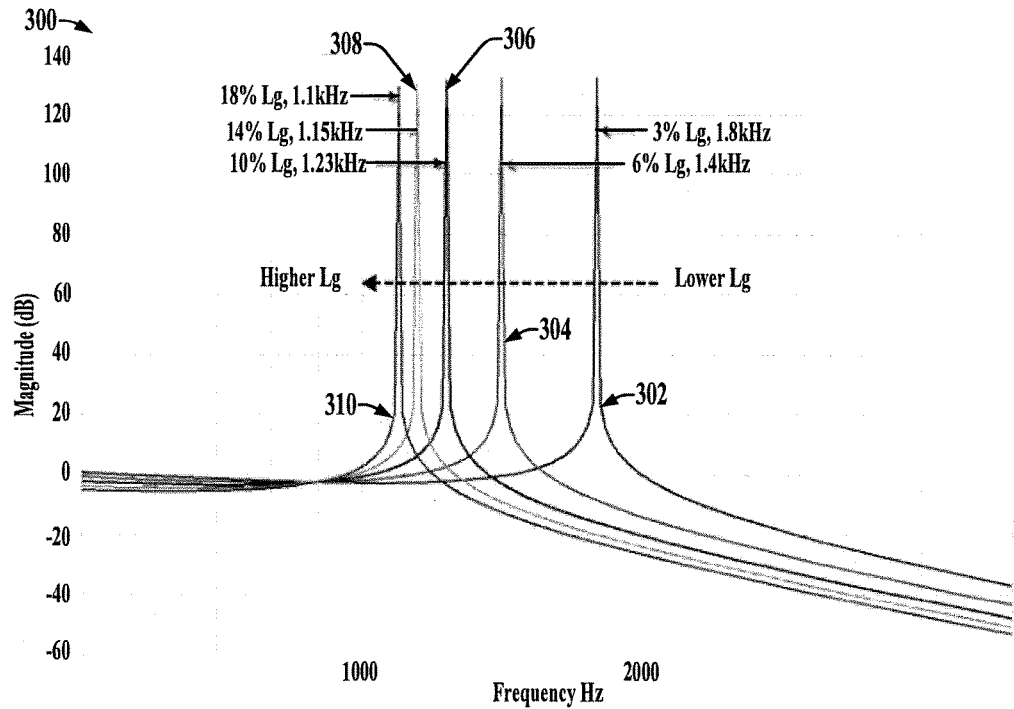
FIG. 3 is a graph.

Referring now to FIG. 3, a graph 300 shows the significant effects of source impedance on the LCL filter frequency response including curves 302, 304, 306, 308 and 310 illustrating the LCL filter transfer function with different 3%, 6%, 10%, 14% and 18% source impedances, respectively. In FIG. 3 the grid side impedance Lg includes the source impedance (the impedance of the power source) as well as grid side inductance (3% L) of the LCL filter, where the source impedance is negligible compare to the grid side inductance if source is more than 20 times the VSC rating. As seen in the graph 300 of FIG. 3, the resonance frequency decreases as the source impedance increases. Consequently, operation of an active front end rectifier of a power converter at a given carrier frequency (e.g., to kilohertz or 4 kHz PWM switching frequency) leads to increased susceptibility of the rectifier switching causing LCL filter resonance conditions as the source impedance varies for different installations or applications. The concepts of the present disclosure facilitate identification of the source impedance and hence the quantification of the overall system resonance frequency in an automated fashion for a given installation, by which active front end rectifier operating parameters can be accordingly adjusted and/or passive damping can be employed to mitigate or avoid LCL filter resonance conditions.

In the example of FIG. 3, the resonance frequency is 1.8 kHz for the LCL filter by itself including a 3% grid side inductor $L_g$ as seen in the curve 302. However, as seen in the curves 304-310, use of the power converter including the LCL filter circuit when connected to a given power source increases the source impedance, where connection to a generator (curve 310 in FIG. 3) in certain applications may cause the total source impedance to increase to almost 5-7 times the grid side inductor $L_g$ of the LCL filter, whereby the resonance frequency may drop to 1.1 kHz or lower and the effective bandwidth of the control loop reduces significantly. As seen in FIG. 3, therefore, if the control loop parameter(s) is/are tuned based only on the LCL filter without considering the source impedance, the reduced control loop bandwidth may lead to instability for step changes in the VSC load. Consequently, it is important to have information regarding the total source impedance for improved VSC control loop tuning for operation of the active front end rectifier converter.

Varying the frequency of the rectifier triangular carrier based PWM operation can be used in accordance with the present disclosure at installation of a power conversion system to estimate the source impedance. In one possible embodiment, the rectifier carrier frequency is swept, either continuously and/or in increments, starting from the standard switching frequency of the conversion system rectifier, which is 4~12 kHz in one example, down to 1~2 kHz while the rectifier of the system is running in closed loop mode. In other embodiments, the system may operate in an open loop fashion during the source impedance estimation process, for example, in a no-load condition. When the carrier frequency sweeps though the resonance frequency of the LCL unit which now includes the AC source, a resonance condition will be detectable. In one possible implementation, the input current and voltage waveform values are measured by the system, for example, at point of common coupling (PCC), with sampling rate at least 5 times standard switching frequency of the system (e.g., 20 kHz sampling frequency) and the samples may be stored in a memory of the power conversion system controller or in an external memory.

The onset of resonance can be detected by any suitable means, for example, by analyzing the voltage and/or current samples to identify changes associated with LCL filter resonance. Non-limiting examples of changes in system operating parameters include DC bus pump up and increase in input current potentially leading to the unit being shut down with either bus over voltage or input over current conditions in the event of uncontrolled resonance. Fast Fourier Transform (FFT) analysis can be performed on either or both of the input current data or voltage data which in order to provide information about the identity of the resonance frequency. Once identified, the resonance frequency can be used to calculate the source impedance using equation (4) below using the known values of $L_g$, $L_c$ and $C_f$.

$$L_g = \frac{L_c}{L_c C_f (2\pi f_{res})^2 - 1} \quad (4)$$

With the identified resonance frequency, the control loop of the power conversion system, particularly the active front end rectifier converter, can be tuned to avoid or mitigate LCL filter resonance conditions in a manner that is specifically tailored to the particular application, for example, by setting a control loop gain for the active front end rectifier. In certain embodiments, the power conversion system controller can be programmed to automatically perform the rectifier carrier frequency adjustment in the computation to identify or estimate the source impedance and the corresponding resonance frequency, and to further provide automatic adjustment to a rectifier control loop gain and/or other power conversion system operating parameters so as to limit or avoid LCL resonance frequency occurrences.

Figure 4:
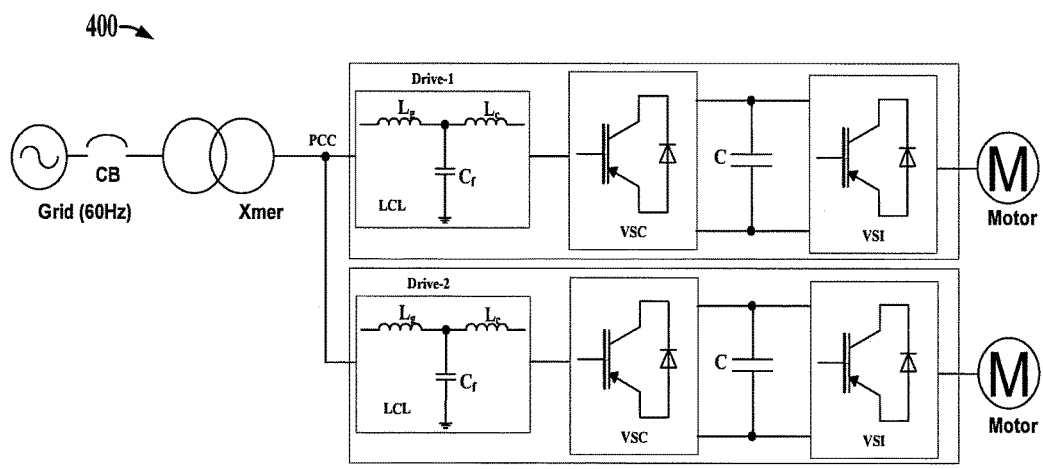
FIG. 4 is a schematic diagram.

Referring also to FIG. 4, even when considering the source impedance and tuning the control loop of the power conversion system, specific cases may exist where active front end rectifier control by itself does not provide enough adjustment to completely avoid LCL resonance conditions. FIG. 4 illustrates a multiple motor drive system 400 having first and second drives Drive-1 and Drive-2 connected to same AC source PCC through a shared transformer Xfmr and control breaker CB. In certain situations, the switching frequency of one of the drives may overlap the LCL resonance frequency of the input filter of the other drive. In such situations, adjustment to the rectifier switching frequency of one or both of the drives may not avoid LCL filter resonance conditions, and active or passive damping can be employed alone or in combination with some amount of active front end rectifier switching frequency adjustment based on the measured or estimated source impedance information. In this regard, active damping control techniques are typically complex, and may lead to additional issues are difficulties if not properly implemented.

Referring also to FIG. 5, further aspects of the present disclosure selectively employ passive damping circuitry in the LCL filter to address such situations, which can be automatically engaged in certain implementations by a motor drive controller or other power conversion system processor based on the resonance frequency identification. FIG. 5 illustrates an exemplary front end LCL filter preceding a VSC active rectifier stage and a DC link circuit with a DC link capacitor C, where the filter circuit embodiment provides for selective introduction of a damping resistance between the filter capacitor $C_f$ and a ground node through operation of a switch SW1. The SW1 is in normally ON or closed position when there is no resonance, with the filter capacitors $C_f$ of each phase being connected in Y configuration to the illustrated ground node without damping resistance. In this condition, there is no additional power wattage loss across the resistors. When the control system detects resonance, SW1 is opened, thereby connecting the resistor in series with the filter capacitor $C_f$ to facilitate damping of the LCL resonance.

Figure 6:
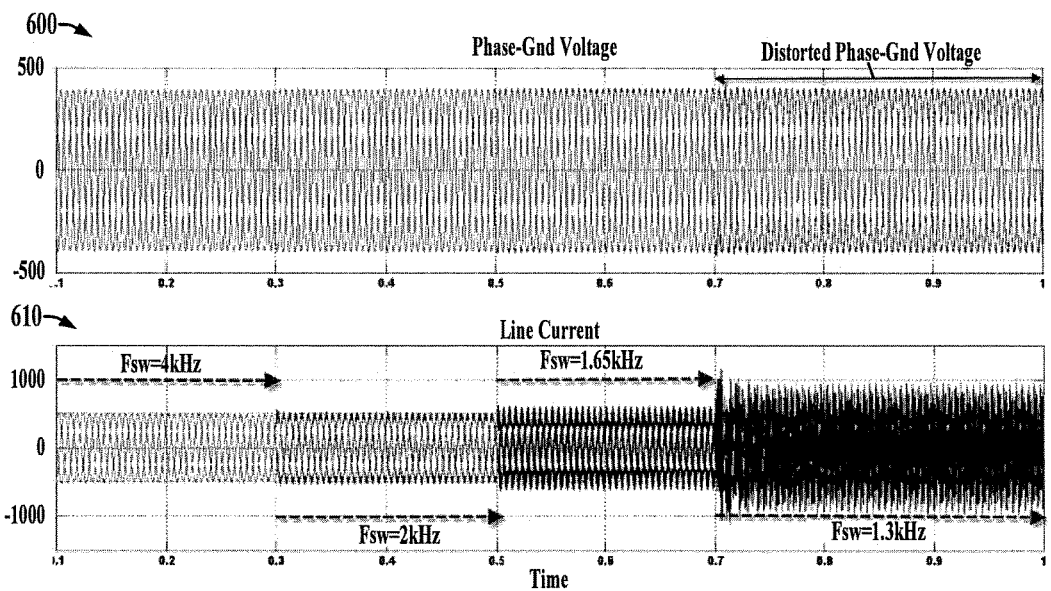
FIG. 6 is a graph.
Figure 7:
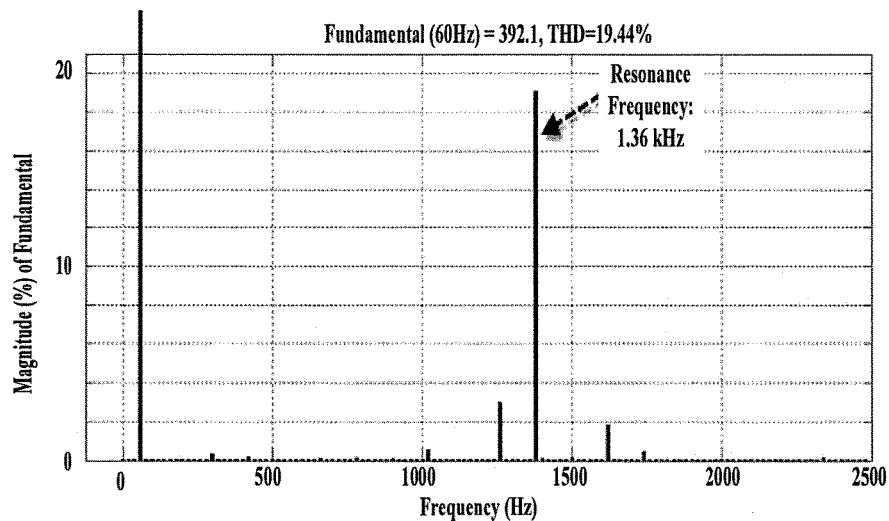
FIG. 7 is a graph.
Figure 8:
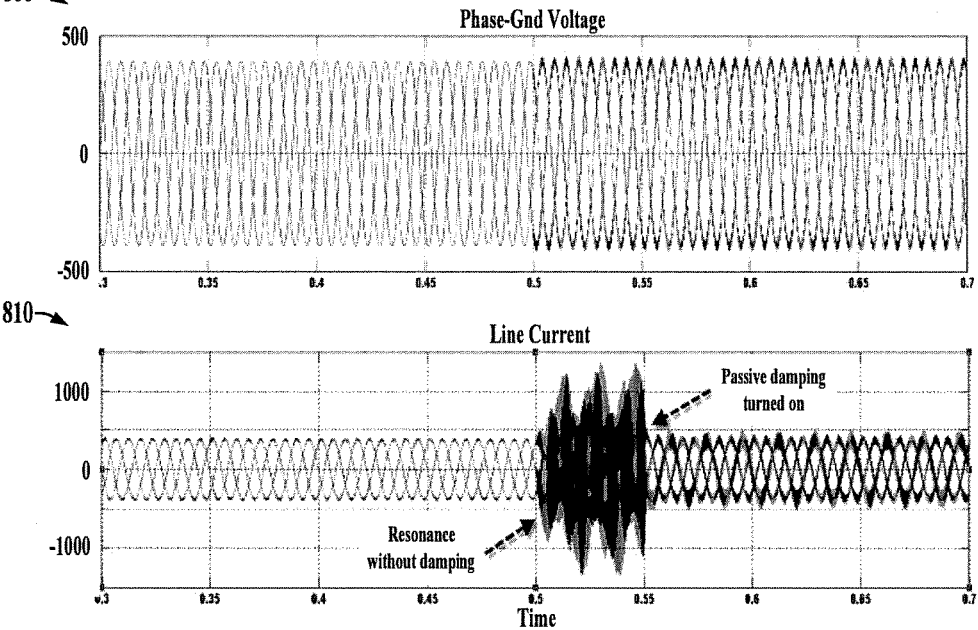
FIG. 8 is a graph.

Referring to FIGS. 6-8, graphs 600 and 610 in FIG. 6 illustrate selective adjustment to incrementally decrease the active front end rectifier switching frequency for a 300 kW VSC with an LCL filter having $L_c$=180 uH, $C_f$=172 uF and $L_g$=60 uH, coupled with an additional source impedance of 60 uH. In this case, separate from the source impedance, the resonance frequency of the LCL filter itself is about 1.8 kHz. As seen in FIG. 6, the rectifier switching frequency is gradually reduced from 4 kHz to 2 kHz, and then to 1.65 kHz, and finally to 1.3 kHz, with the illustrated system operating at each incremental frequency for approximately 0.2 seconds in one example. Other embodiments are possible, for example, using continuous switching frequency reduction, or other incremental frequency reduction, or combinations thereof. In this example, as the carrier frequency is reduced to 1.65 kHz the resonance gradually increases and reaches a peak level at 1.3 kHz, where the graph 600 and FIG. 6 illustrates the onset of distortion in the phase-ground voltage at the switching frequency of 1.3 kHz, and the graph 610 shows a significant increase in the line current amplitude when the 1.3 kHz rectifier switching operation is used. The controller in one example evaluates current and voltage samples to identify equivalent distortion on the phase to ground voltage and/or to identify significant increases in the amplitude of the current samples, and any suitable technique can be used, such as threshold comparisons, frequency analysis, etc in order to ascertain the resonance frequency of the overall system.

Referring also to FIG. 7, frequency analysis is performed in one example on the voltage waveform to yield an exact or fairly close estimate of the frequency of the resonance. This information is then used to predict the source impedance, for example, using equation (4) above. The graph 700 in FIG. 7 shows fast Fourier transform (FFT) analysis of the voltage waveform (graph 600 and FIG. 6), to identify the resonance frequency component at approximately 1.36 kHz. Calculation of the source impedance using equation (4), yields a value of 60 uH in this example, which matches the source impedance values used for the simulation, whereby the disclosed techniques provide a quick, cost-effective automated process for identifying and accommodating a particular source impedance situation for a given installation. This technique may also be employed in systems in which two drives are connected to same PCC (e.g., as in FIG. 4 above).

Figure 9:
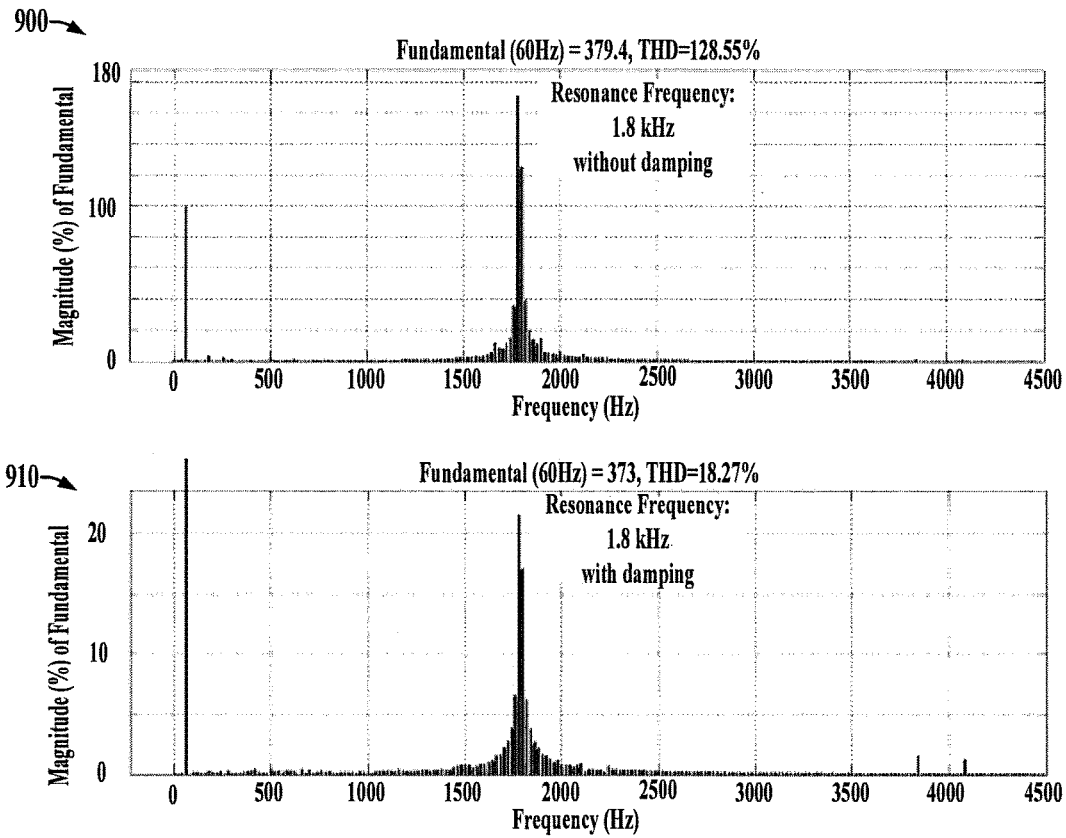
FIG. 9 is a graph.
Figure 10:
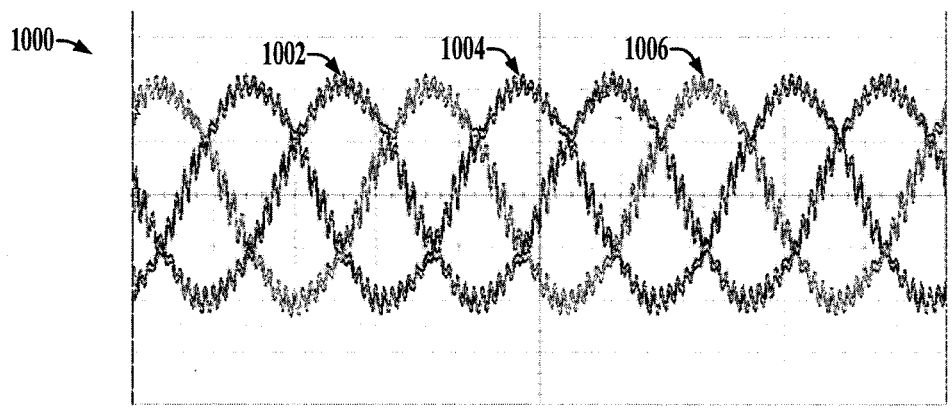
FIG. 10 is a graph.

Referring also to FIGS. 8 and 10, graphs 800 and 810 illustrate simulation of a scenario with 1.6 kHz noise added to the source, where the source impedance is ignored for simulation purposes. As seen in FIG. 8, when noise is introduced to the source at 0.5 seconds, the power conversion system starts resonating, with a significant increase in the line current amplitude shown in the graph 810 and distortion seen in the phase-ground voltage of graph 800. At time 0.55 seconds, a damping resistor is placed in series with filter capacitor by opening the switch SW1 in FIG. 5 above, thereby significantly reducing the resonance as shown after time 0.55 seconds in FIG. 8. In this example, the total harmonic distortion (THD) is reduced from 128% to 18% as shown in the graphs 900 and 910 of FIG. 9. The graph 1000 in FIG. 10 shows the experimental results of the resonance with noise introduce to the line voltage curves 1002, 1004 and 1006 for a three-phase system.

Figure 11:
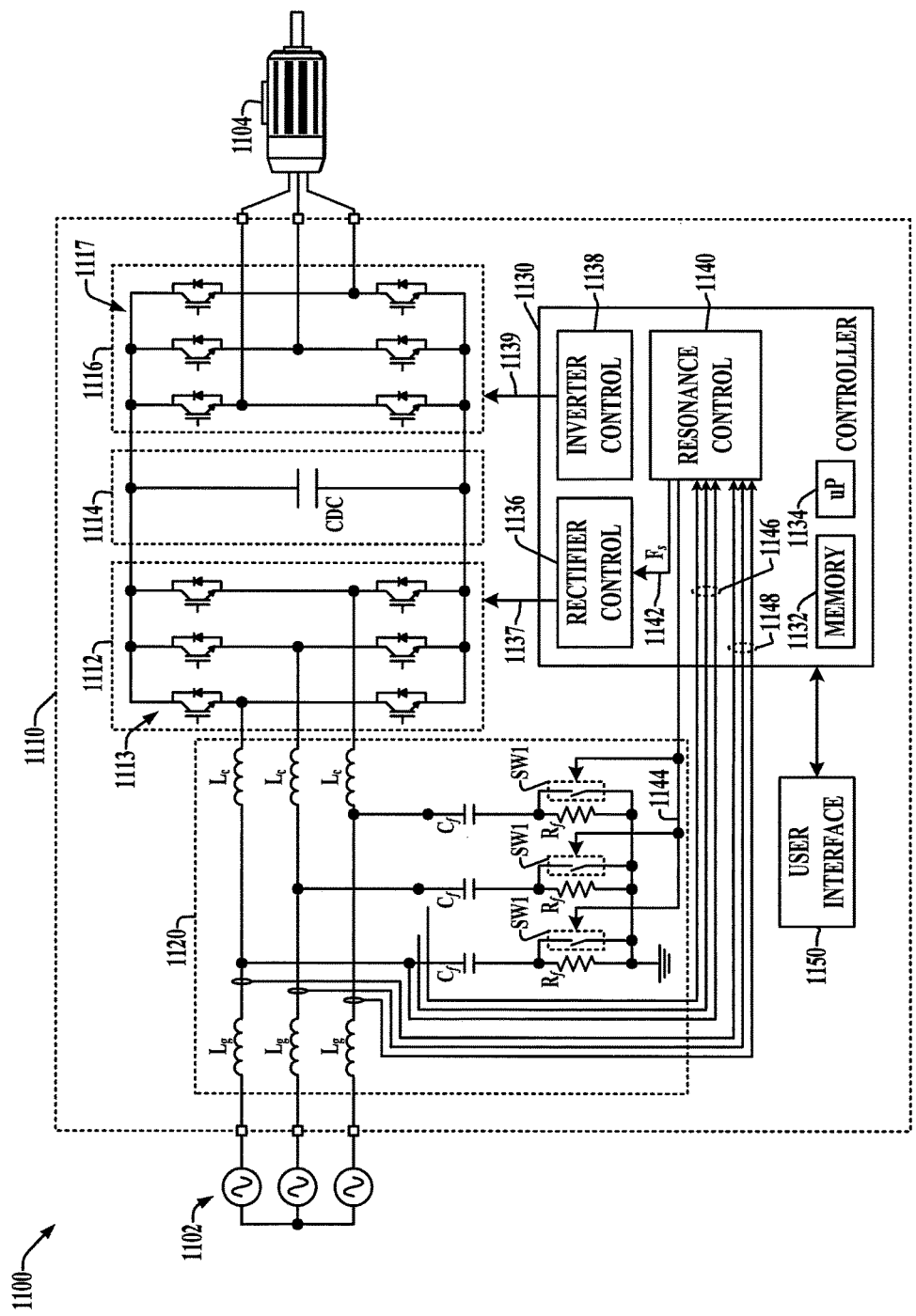
FIG. 11 is a schematic diagram.

FIG. 11 provides a system diagram 1100 illustrating further details of a motor drive power conversion system 1110 embodiment including resonance control concepts for mitigating LCL filter resonance. Although illustrated and described in the context of the example LCL filter circuit 1120 in the system 1100, the concepts of the present disclosure can be used in connection with other input filter circuit configurations, including without limitations LC filters having a single in-line inductor and a filter capacitor associated with each AC input line or other filter types and architectures. The illustrated power conversion system or converter 1110 in this example is a motor drive receiving three-phase AC input power from a source 1102 at a fundamental line frequency (e.g., 50 Hz or 60 Hz) and providing a variable frequency, variable amplitude multiphase AC output to drive a three-phase motor load 1104.

The power conversion system 1110 includes an active (e.g., switching) input rectifier 1112 with rectifier switching devices 1113 forming an active front end (AFE) converting received AC input power from the source 1102 to provide a controlled DC bus voltage across a bus capacitance CDC of an intermediate DC circuit 1114. The DC bus voltage of the intermediate circuit 1114 is provided as an input to a switching multiphase inverter 1116 with switching devices 1117 individually operative to selectively couple a corresponding positive or negative DC bus input terminal with corresponding three-phase output lines to drive the motor load 1104. The rectifier 1112 and inverter 1116 are operated according to rectifier switching control signals 1137 and inverter switching control signals 1139 from rectifier and inverter control components 1136 and 1138, respectively, of a drive controller 1130 for initial conversion of AC input power into DC power in the intermediate DC link circuit 1114 and conversion of the DC power into AC output power to drive the load 1104. The controller 1130 can employ any suitable control techniques such as pulse width modulation in open loop and/or closed-loop fashion according to one or more setpoint input signals or values and/or one or more sensor feedback signals or values (not shown).

The load 1104 may be directly driven by the output of the motor drive 1110, or one or more intervening circuits may be connected between the inverter 1116 and the motor load 1104, such a sine wave filter and/or a transformer (not shown). The active front end rectifier 1112 and the switching inverter 1116 may include any suitable switching devices 1113, 1117, including without limitation insulated gate bipolar transistors (IGBTs) as shown in FIG. 11, silicon controlled rectifiers (SCRs), gate turn-off thyristors (GTOs), insulated gate commutated thyristors (IGCTs), etc. Although illustrated and described in FIG. 11 in the context of three-phase AC inputs and three-phase AC load outputs, the various concepts of the present disclosure can be employed in connection with systems using other single or multiphase inputs and/or single or multiphase outputs. In addition, the active front end concepts of present disclosure can be employed in systems providing an AC output via a switching inverter 1116 or other suitable circuitry, as well as in power conversion systems receiving AC input power, whether single or multiphase, through an LCL, LC or other input filter and providing a DC output via an active switching rectifier 1112 with the inverter circuitry 1116 being omitted in certain embodiments.

As seen in FIG. 11, moreover, the motor drive 1110 includes an input LCL filter circuit 1120 including grid side inductors $L_g$ and converter side inductors $L_c$ in each input phase, with filter capacitors $C_f$ individually coupled to a corresponding phase line. In addition, as discussed above in connection with FIG. 5, the illustrated LCL filter circuit 1120 in FIG. 11 further includes a switch SW1 and a damping or filter resistor $R_f$ coupled in parallel with one another between a corresponding one of the filter capacitors $C_f$ and a common neutral point or ground.

The drive controller 1130 can be any suitable analog and/or digital hardware, including one or more processor elements 1134 and associated electronic memory 1132, where the processor 1134 is operative according to processor-executed software and/or processor-executed firmware (e.g., stored in the memory 1132), programmable logic, FPGAs, etc. and/or combinations thereof to implement the rectifier control component 1136 to provide the rectifier switching control signals 1137 as well as to provide the inverter switching control signals 1139 via a processor-implemented inverter control component 1138. In addition, the controller 1130 may include suitable analog interface circuitry, such as gate drivers, communications interfaces, etc. by which suitable signals 1137 and 1139 are provided to operate the switching devices 1113 and 1117 and by which one or more feedback or sensor signals or values are received.

Moreover, the controller 1130 includes a resonance control component 1140 implemented using the at least one processor 1134, which provides a signal and/or value 1142 representing a switching frequency or carrier frequency $F_s$ to the rectifier control component 1136, and also provides a switching control signal 1144 to operate the switch SW1 of the LCL filter circuit 1120 in order to selectively add or remove damping resistance $R_f$ from the circuit 1120. Moreover, the resonance control component 1140 receives one or more feedback signals and/or values 1146 representing the line-ground voltages of the LCL filter circuit 1120 and/or signals and/or values 1148 indicative of the line currents in the LCL circuit 1120.

Figure 12:
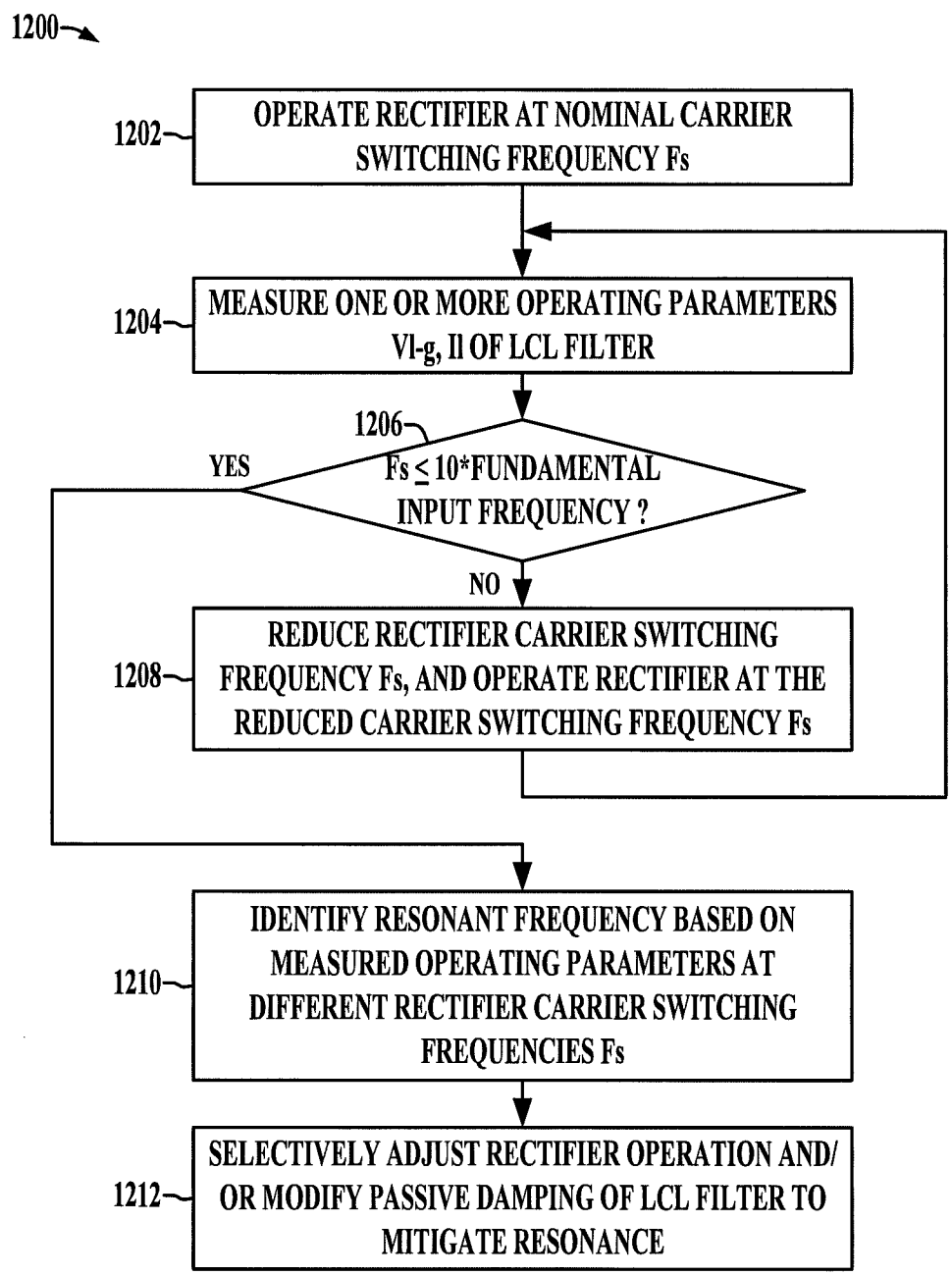
FIG. 12 is a flow diagram.

Referring also to FIG. 12, a process 1200 is illustrated for controlling LCL filter resonance in the power conversion system 1110, which may be implemented by the resonance control component 1140 in the drive controller 1130 of FIG. 11. Although the method 1200 is illustrated and described as a series of acts or events, the methods of the present disclosure are not limited by the illustrated ordering of such acts or events except as specifically set forth herein. Except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software or processor-executed firmware, programmable logic, etc. or combinations thereof, including without limitation the controller processor 1134 and FIG. 11, and various embodiments or implementations include non-transitory computer readable mediums such as the electronic memory 1132 in FIG. 11 having computer-executable instructions for performing the illustrated and described methods. For example, the method 100 may be implemented by fear the resonance control component 1140 of the drive controller 1130 as described herein using program instructions and data stored in the electronic memory 1132 of the controller 1130, although the method 100 can be implemented in other systems, including without limitation those illustrated and described herein.

At 1202 in FIG. 12, the resonance control component 1140 of the drive controller 1130 provides a nominal switching frequency $F_s$ to the rectifier control component 1136, such as by passing a signal or value 1142 (FIG. 11) with which the rectifier controller 1136 provides the switching control signals 1137 to operate the switching devices 1113 of the switching rectifier 1112. At 1204, one or more operating parameters associated with the drive 1110 are measured while the rectifier is operated at the nominal switching frequency F. In one non-limiting example, the nominal switching frequency can be 4 kHz, and the controller 1130 operates the switching rectifier 1112 using a carrier frequency (switching frequency) of 4 kHz at 1202 in FIG. 12.

In one possible embodiment, moreover, the rectifier controller 1136 operates the rectifier 1112 in a closed loop mode at 1204 in FIG. 12, preferably with a load provided by operation of the switching inverter 1116 to drive a motor or other load 1104 while measuring one or more electrical operating parameters associated with the drive 1110. In another possible implementation, the rectifier 1112 is operated at 1204 in an open loop mode (e.g., with a fixed or constant duty cycle) while one or more electrical operating parameters of the drive 1110 are measured. Any suitable single or multiple drive-related operating parameters can be measured at 1204. In one non-limiting embodiment, the line-ground voltage of the LCL filter circuit 1120 is measured via the feedback signals 1146 shown in FIG. 11, and the line current values I1 are also measured at 1204 via the feedback signals 1148 in FIG. 11. In this regard, the example of FIG. 11 shows measurement of the line-ground voltages at the intermediate node joining the grid-side inductors and the converter-side inductors. Other line-ground measurement points may be used, for example, at the inputs of the switching rectifier 1112, and/or at the AC input nodes of the drive 1110. In addition, other voltage and/or current signals or values may be measured directly or indirectly at 1204 in the process 1200 of FIG. 12, for example, line-line voltage measurements, etc.

At 1206 in FIG. 12, the resonance control component 1140 of the drive controller 1130 makes a determination as to whether the switching frequency is less than or equal to constant (e.g., 10 in the illustrated example) times a fundamental AC input frequency (e.g., 50 Hz or 60 Hz in certain applications). If not (NO at 1206), the resonance control component 1140 reduces the rectifier carrier switching frequency at 1208, and operates the rectifier 1112 at the reduced switching frequency, and the process returns to 1204 for measurement of one or more drive operating parameters. Any suitable adjustment increment can be used, for example, 10 Hz, 100 Hz, 200 Hz, etc. in various embodiments. In one possible embodiment, moreover, the processing at 1204, 1206 and 1208 is repeated with the gradual incremental reduction of the rectifier switching frequency from the initial nominal value toward the fundamental frequency of the AC input power. In other possible implementations, the frequency may be swept or decreased in a non-incremental fashion, with measurements of one or more operating parameters of the drive 1110 being obtained for different rectifier switching frequency values. In the implementation shown in FIG. 12, the frequency adjustment and parameter measurement processing ends when the fundamental input frequency has been reached (YES at 1206). In other embodiments, the process at 1204, 1206 and 1208 is completed before reaching the fundamental input frequency. Thereafter, the resonance control component 1140 identifies a resonant frequency at 1210 in FIG. 12 based at least partially on the measured operating parameters at different switching frequencies, and selectively adjusts the rectifier operation and/or modifies the passive damping of the LCL filter circuit 1120 at 1212 to mitigate resonance.

The present disclosure thus provides techniques and apparatus which can be advantageously employed in a motor drive or other power conversion system to automatically estimate the source impedance and provide resonance mitigation techniques. One advantage of the concepts of the present disclosure is to estimate the source impedance accurately and use it to tune the active front end rectifier converter control loop to avoid or mitigate resonance. Furthermore, in situations in which AFE control adjustment alone cannot avoid the LCL filter resonance, further resonance mitigation techniques can be undertaken, for example, the selective employment of LCL filter damping resistors in an automated fashion under control of a drive controller to switch the damping resistance circuit in series with the filter capacitor. This advantageously alleviates resonance issues and allows the power conversion system to operate, even if with reduced performance. Moreover, the resonance mitigation concepts of the present disclosure are energy efficient because the damping resistor is only in circuit if control cannot avoid the resonance, and provides a much simpler solution then complicated active damping control techniques.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for controlling filter resonance in a power conversion system, comprising:
    (a) connecting an active front end power conversion system to an AC source;
    (b) operating a rectifier of the power conversion system at a switching frequency;
    (c) measuring at least one electrical operating parameter while operating the rectifier at a first switching frequency;
    (d) reducing the switching frequency to a reduced switching frequency less than the first switching frequency, operating the rectifier at the reduced switching frequency, and measuring the at least one electrical operating parameter while operating the rectifier at the reduced switching frequency;
    (e) repeating (d) at least once;
    (f) evaluating the measured at least one electrical operating parameters at different switching frequencies to identify a resonance frequency; and
    (g) selectively adjusting at least one operating parameter of the rectifier based on the identified resonance frequency by selectively connecting at least one damping resistance in an LCL filter circuit of the power conversion system to mitigate filter resonance.

2. The method of claim 1, wherein the selectively adjusting at least one operating parameter of the rectifier comprises setting the switching frequency for operating the rectifier of the power conversion system to avoid the identified resonance frequency.

3. The method of claim 1, comprising repeating (d) until the reduced switching frequency is less than or equal to a constant times a fundamental AC input frequency, wherein the constant is greater than 1.

4. The method of claim 3, wherein the selectively adjusting at least one operating parameter of the rectifier comprises tuning at least one control loop of the power conversion system.

5. The method of claim 4, wherein the selectively adjusting at least one operating parameter of the rectifier comprises setting the switching frequency for operating the rectifier of the power conversion system to avoid the identified resonance frequency.

6. The method of claim 5, wherein the rectifier is operated in a closed loop mode while measuring the at least one electrical operating parameter.

7. The method of claim 5, wherein the rectifier is operated in an open loop mode while measuring the at least one electrical operating parameter.

8. The method of claim 1, wherein the selectively adjusting at least one operating parameter of the rectifier comprises setting the switching frequency for operating the rectifier of the power conversion system to avoid the identified resonance frequency.

9. The method of claim 8, wherein the rectifier is operated in a closed loop mode while measuring the at least one electrical operating parameter.

10. The method of claim 8, wherein the rectifier is operated in an open loop mode while measuring the at least one electrical operating parameter.

11. A method for controlling filter resonance in a power conversion system, comprising:
    (a) connecting an active front end power conversion system to an AC source;
    (b) operating a rectifier of the power conversion system at a switching frequency;
    (c) measuring at least one electrical operating parameter while operating the rectifier at a first switching frequency;
    (d) reducing the switching frequency to a reduced switching frequency less than the first switching frequency, operating the rectifier at the reduced switching frequency, and measuring the at least one electrical operating parameter while operating the rectifier at the reduced switching frequency;
    (e) repeating (d) at least once;
    (f) evaluating the measured at least one electrical operating parameters at different switching frequencies to identify a resonance frequency;
    (g) selectively adjusting at least one operating parameter of the rectifier based on the identified resonance frequency to mitigate filter resonance; and
    repeating (d) until the switching frequency is less than or equal to a constant times a fundamental AC input frequency, wherein the constant is greater than 1.

12. The method of claim 11, wherein the selectively adjusting at least one operating parameter of the rectifier comprises tuning at least one control loop of the power conversion system.

13. The method of claim 11, wherein the selectively adjusting at least one operating parameter of the rectifier comprises setting the switching frequency for operating the rectifier of the power conversion system to avoid the identified resonance frequency.

14. The method of claim 11, wherein the rectifier is operated in a closed loop mode while measuring the at least one electrical operating parameter.

15. The method of claim 11, wherein the rectifier is operated in an open loop mode while measuring the at least one electrical operating parameter.

16. The method of claim 11, comprising selectively connecting at least one damping resistance in an LCL filter circuit of the power conversion system to mitigate resonance.

17. A power conversion system, comprising:
a switching rectifier;
a filter circuit connected to an input of the switching rectifier, wherein the filter circuit comprises at least one damping resistance and at least one switching circuit; and
at least one processor operatively coupled with an electronic memory and programmed to:
(a) operate the switching rectifier at a switching frequency,
(b) measure at least one electrical operating parameter of the power conversion system while operating the switching rectifier at a first switching frequency,
(c) reduce the switching frequency to a reduced switching frequency less than the first switching frequency, operate the switching rectifier at the reduced switching frequency, and measure the at least one electrical operating parameter while operating the switching rectifier at the reduced switching frequency,
(d) repeat (c) at least once,
(e) evaluate the measured at least one electrical operating parameters at different switching frequencies to identify a resonance frequency,
(f) selectively adjust at least one operating parameter of the switching rectifier based on the identified resonance frequency to mitigate LCL filter resonance, including setting the switching frequency for operating the switching rectifier to avoid the identified resonance frequency, and
(g) selectively operate the switching circuit to connect the at least one damping resistance in the filter circuit to mitigate resonance.

18. The power conversion system of claim 17, wherein the at least one processor is programmed to operate the switching rectifier in a closed loop mode while measuring the at least one electrical operating parameter.

19. A non-transitory computer readable medium with contributor executable instructions for controlling filter resonance in a power conversion system, the non-transitory computer readable medium having computer executable instructions for:
(a) connecting an active front end power conversion system to an AC source;
(b) operating a rectifier of the power conversion system at a switching frequency;
(c) measuring at least one electrical operating parameter while operating the rectifier at a first switching frequency;
(d) reducing the switching frequency to a reduced switching frequency less than the first switching frequency, operating the rectifier at the reduced switching frequency, and measuring the at least one electrical operating parameter while operating the rectifier at the reduced switching frequency;
(e) repeating (d) at least once;
(f) evaluating the measured at least one electrical operating parameters at different switching frequencies to identify a resonance frequency; and
(g) selectively adjusting at least one operating parameter of the rectifier based on the identified resonance frequency to mitigate filter resonance, including setting the switching frequency for operating the switching rectifier to avoid the identified resonance frequency.

* * * * *